(12) United States Patent
Marsteller et al.

(10) Patent No.: US 12,537,384 B2
(45) Date of Patent: Jan. 27, 2026

(54) METHOD FOR ANALYZING A CHARGING PROCESS OF AN ELECTRICAL ENERGY STORAGE APPARATUS BY A CHARGING APPARATUS

(71) Applicant: Volkswagen Aktiengesellschaft, Wolfsburg (DE)

(72) Inventors: Felix Marsteller, Braunschweig (DE); Martin Obholz, Lehre (DE); Martin Schachel, Königslutter (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 1051 days.

(21) Appl. No.: 17/575,974

(22) Filed: Jan. 14, 2022

(65) Prior Publication Data

US 2022/0224130 A1 Jul. 14, 2022

(30) Foreign Application Priority Data

Jan. 14, 2021 (DE) ...................... 10 2021 200 284.6

(51) Int. Cl.
*H02J 7/00* (2006.01)
*B60L 53/30* (2019.01)
(Continued)

(52) U.S. Cl.
CPC ........ *H02J 7/00036* (2020.01); *B60L 53/305* (2019.02); *B60L 53/62* (2019.02); *B60L 53/65* (2019.02); *B60L 53/66* (2019.02)

(58) Field of Classification Search
CPC ........ B60L 53/305; B60L 53/62; B60L 53/65; B60L 53/66; B60L 3/00; H01M 10/44;
(Continued)

(56) References Cited

U.S. PATENT DOCUMENTS 9,161,104 B2 10/2015 Park
10,363,833 B2 7/2019 Dudar
(Continued)

FOREIGN PATENT DOCUMENTS

CN 102255113 A 11/2011 ............. B60L 11/18
CN 106872835 A 6/2017 ............. G01R 31/00
(Continued)

OTHER PUBLICATIONS

German Search Report, Application No. 102021200284.6, 6 pages, Aug. 27, 2021.
(Continued)

*Primary Examiner* — David V Henze-Gongola
(74) *Attorney, Agent, or Firm* — Slayden Grubert Beard PLLC (57) ABSTRACT

The disclosure relates to a method for analyzing a charging process of an electrical energy storage apparatus by a charging apparatus, by means of which electrical energy may be provided via a charging link for the energy storage apparatus, wherein a communication link is provided between the energy storage apparatus and the charging apparatus by means of which information may be exchanged between the energy storage apparatus and the charging apparatus, a transmission of information via the communication link is assessed by an electronic computing apparatus, by means of the electronic computing apparatus, an evaluation of the charging process is prepared based on the assessment of the information transmission, and the evaluation of the charging process is output by an output apparatus.

19 Claims, 1 Drawing Sheet

(51) Int. Cl.
   *B60L 53/62* (2019.01)
   *B60L 53/65* (2019.01)
   *B60L 53/66* (2019.01)

(58) Field of Classification Search
   CPC ........ H04L 67/12; H04L 43/08; H02J 7/0045;
                H02J 7/00034; H02J 7/00045; H02J
                7/0047; H02J 7/00036; G01R 31/388;
                G01R 31/371; G01R 31/389
   See application file for complete search history.

(56) References Cited

U.S. PATENT DOCUMENTS

| | | | | |
|---|---|---|---|---|
| 2003/0085621 | A1* | 5/2003 | Potega | G06F 1/26 |
| | | | | 307/18 |
| 2010/0094496 | A1* | 4/2010 | Hershkovitz | B60L 50/66 |
| | | | | 701/22 |
| 2010/0289451 | A1* | 11/2010 | Tuffner | B60L 53/14 |
| | | | | 320/109 |
| 2015/0120109 | A1* | 4/2015 | Cun | B60L 3/003 |
| | | | | 320/137 |
| 2015/0188739 | A1* | 7/2015 | Igarashi | B60L 53/00 |
| | | | | 375/257 |
| 2017/0136912 | A1 | 5/2017 | Ricci | 320/108 |
| 2020/0207236 | A1 | 7/2020 | Skrbic et al. | |

FOREIGN PATENT DOCUMENTS

| | | | |
|---|---|---|---|
| CN | 107117058 A | 9/2017 | ............. B60L 11/18 |
| CN | 107290580 A | 10/2017 | ............. G01D 21/02 |
| CN | 108899966 A | 11/2018 | ................ H02J 7/00 |
| CN | 111016718 A | 4/2020 | ............. B60L 53/302 |
| CN | 111505430 A | 8/2020 | ............. G01R 13/04 |
| DE | 102012214006 A1 | 6/2013 | ............. G01R 31/36 |
| DE | 102013211265 A1 | 12/2014 | ............. B60L 11/18 |
| DE | 102018105624 A1 | 10/2018 | ............. B60L 11/18 |
| WO | 2019/034457 A1 | 2/2019 | ............. B60L 53/124 |

OTHER PUBLICATIONS

Chinese Office Action, Application No. 202210041520.1, 8 pages, Jun. 17, 2025.

* cited by examiner

METHOD FOR ANALYZING A CHARGING PROCESS OF AN ELECTRICAL ENERGY STORAGE APPARATUS BY A CHARGING APPARATUS

CROSS-REFERENCE TO RELATED APPLICATIONS

This application claims priority to German Patent Application No. DE 10 2021 200 284.6, filed on Jan. 14, 2021 with the German Patent and Trademark Office. The contents of the aforesaid Patent Application are incorporated herein for all purposes.

TECHNICAL FIELD

The invention relates to a method for analyzing a charging process of an electrical energy storage apparatus by a charging apparatus.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A power quality monitoring system for a charging station of an electric vehicle is known from CN 107 117 058 A. This system is configured to monitor, analyze, evaluate and predict power quality of the entire charging station, and is furthermore configured to diagnose, analyze, compare, evaluate and assess power quality problems that are caused by individual charger branches and the charging station as a whole. To ensure data consistency and comparability at all measuring points, the system uses a uniform timing function. A prediction of a power quality trend may be made in this context based on current and historical power quality data.

SUMMARY

A need exists to create a solution that, on the one hand, enables a very reliably prediction of a course of a charging process of an electrical energy storage apparatus and, on the other hand, a very reliable analysis of a cause of a charging interruption.

The need is addressed by a method for analyzing a charging process of an electrical energy storage apparatus by a charging apparatus having the features of the independent claim(s). Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect relates to a method for analyzing a charging process of an electrical energy storage apparatus by a charging apparatus. By means of the charging apparatus, electrical energy for the energy storage apparatus may be provided by a charging link. The energy storage apparatus is in particular an energy storage apparatus of a vehicle, in particular a motor vehicle, in particular a motor car. In this case, the energy storage apparatus is in particular designed as a high-voltage battery. In the method, a communication link is provided between the energy storage apparatus and the charging apparatus, by means of which information may be exchanged between the energy storage apparatus and the charging apparatus. The communication link may be a link between the energy storage apparatus and the charging apparatus provided by a line. The communication link is in particular provided by a so-called control pilot line. Alternatively or in addition, the communication link may be provided wirelessly, for example by a radio link, between the energy storage apparatus and the charging apparatus. This communication link is in particular designed separate from the charging link. This means that the communication link is configured to transmit information between the energy storage apparatus and the charging apparatus, whereas the charging link is configured to transmit electrical energy for charging the energy storage apparatus from the charging apparatus to the energy storage apparatus. The method moreover provides that a transmission of information via the communication link is assessed by an electronic computing apparatus. Moreover, the method provides that, by means of the electronic computing apparatus, an evaluation of the charging process is prepared based on the assessment of the information transmission. In particular, by means of the electronic computing apparatus, a quality, and/or a success, or a failure of the charging process may be established based on the assessment of the information transmission. This evaluation of the charging process is output in the method by an output apparatus. For this purpose, the output apparatus may for example be designed as a display apparatus, in particular as a screen apparatus, by means of which the evaluation of the charging process may be visually displayed and therefore output. Alternatively or in addition, the evaluation of the charging process may be output by the output apparatus acoustically and/or haptically. By outputting the evaluation of the charging process by the output apparatus, an owner of the energy storage apparatus and/or the charging apparatus may be informed about a result of the evaluation of the charging process. In addition, the evaluation of the charging process may be provided for a higher-level server apparatus such as a backend system, and/or for a mobile electronic terminal, by means of which the evaluation of the charging process may be output visually, and/or acoustically, and/or haptically.

This method is based on the insight that an interruption of the charging process may occur while charging the energy storage apparatus. Such an interruption may occur due to a communication problem or other faults in the charging apparatus or the energy storage apparatus. The communication problem may for example arise in pulse width modulation, and/or power line communication, and/or in controller area network communication, and/or in other communication protocols. By using different input variables, in particular by assessing the information transmission via the communication link, a statement may be made about suspected quality of the charging process in the charging apparatus, and an automated analysis may also be performed if the charging process fails. By this analysis of communication between the energy storage apparatus and the charging apparatus via the communication link, the charging process may therefore be evaluated very effectively. The information obtained in this manner may be output directly to a user by the output apparatus, and/or saved as an error record in the electronic computing apparatus. With the addition of geo-coordinates, faulty charging points may be identified. The method therefore makes it possible to very effectively analyze the charging process.

In some embodiments, analytical data of the communication link are determined by the electronic computing apparatus for the assessment of information transmission, transmission quality of the communication link is assessed based on the analytical data, and the charging process is evaluated based on the assessment of the transmission quality of the communication link. In the assessment of the transmission quality of the communication link, quality of transmission of signals is in particular assessed, and in particular analog and/or digital signals, and/or quality of transmission of information, in particular with respect to distortion of information. This means that the electronic computing unit determines, for the assessment of information transmission using the analytical data of the communication link, how well signals and/or information are being transmitted via the communication link between the energy storage apparatus and the charging apparatus. Since there is a danger of a charging interruption when there is faulty signal transmission, or respectively faulty information transmission, a particularly reliable statement may be made from the assessment of the information transmission based on the analytical data of the communication link about whether there is a danger that an interruption of the charging process could be caused by the communication link, and the probability with which an interruption will occur in the charging process.

Some embodiments provide that, by means of the electronic computing apparatus and based on the assessment of the transmission quality of the communication link, a prediction and therefore a forecast is made of a course of the charging process, and/or a forecast of the transmission quality of the communication link, and the prediction is output by the output apparatus. In this case, a probability may for example be determined in the context of the prediction that the charging process will be interrupted by a fault caused by the communication link. By means of the display apparatus, the transmission quality of the communication link forecast in the prediction may be visually output by a light signal with a form correlating with the particular predicted quality of the information transmission of the communication link. In this case, the light signal may for example be output in the form of a bar whose level corresponds with the predicted quality of the information transmission of the communication link, or as a number on the bar correlating with the particular predicted quality of the information transmission of the communication link. Thus, on the one hand, the forecast of a probable course of the charging process may be made and, on the other hand, a user may be informed about the probable course of the charging process. Accordingly, a very reliable forecast of a course of the charging process including communication via the communication link may be enabled.

In some embodiments, at least one actual charging parameter of the electrical energy transmitted via the charging link is determined and, by means of the electronic computing apparatus, at least one target charging parameter, provided via the communication link from the energy storage apparatus or the charging apparatus, is compared with the determined actual charging parameter to assess the information transmission and is evaluated based on the comparison of the charging process. This means that a target charging parameter characterizing the electrical energy to be transmitted, which is transmitted via the communication link between the energy storage apparatus and the charging apparatus, is compared with an actual charging parameter of the transmission of the electrical energy resulting in the charging link. By means of this comparison of the actual charging parameter with the target charging parameter, it may be established whether the information characterizing the target charging parameter and transmitted via the communication link has been correctly transmitted from the energy storage apparatus to the charging apparatus, or respectively from the charging apparatus to the energy storage apparatus, and whether the transmission of electrical energy via the charging link has been adjusted corresponding to the target charging parameter because the information has been correctly transmitted via the communication link. If a deviation between the target charging parameter and the actual charging parameter is established in the comparison, then it may be established in the evaluation of the charging process that there is a fault in the charging process. This fault may for example be caused by the charging apparatus, and/or by the energy storage apparatus, and/or by the charging link, and/or by the communication link. The comparison of the actual charging parameter with the target charging parameter makes it possible to very easily ascertain correct information transmission via the communication link between the energy storage apparatus and the charging apparatus.

In some embodiments, at least one power line communications signal provided via the charging link by power line communication is determined, and the evaluation of the charging process is also carried out based on the at least one determined power line communication signal. Power line communication may also be called so-called power line communication. At least one piece of information may be exchanged via the power line communication signal between the charging apparatus and the energy storage apparatus, wherein the at least one piece of information is transmitted by power line communication via the charging link. Thus, the power line communication via the charging link may be included for the evaluation of the charging process in addition to the assessment of the information transmission via the communication link. The inclusion of power line communication via the charging link in the evaluation of the charging process makes it possible to very comprehensively evaluate the charging process. In doing so, a particularly large part of communication between the energy storage apparatus and the charging apparatus, in particular all the communication between the energy storage apparatus and the charging apparatus, is used for the evaluation of the charging process. This enables particularly reliable evaluation of the charging process.

In some embodiments, an interruption of the charging process is determined by the electronic computing apparatus and a cause of the charging interruption is determined while evaluating the charging process based on the assessment of the information transmission via the communication link. This means that a search for a cause of the charging interruption is started by the electronic computing apparatus once the interruption of the charging process has been determined. In this case, the cause of the charging interruption may be determined based on a comparison of the target charging parameter with the determined actual charging parameter. In doing so, the cause of the charging interruption may be determined based on a particular type of actual charging parameter, or respectively target charging parameter used for the comparison, and based on a deviation, determined in the context of the comparison, between the actual charging parameter and target charging parameter compared with each other. The cause of the charging interruption may for example be deduced to be a faulty charging apparatus, and/or a faulty energy storage apparatus, and/or a faulty communication link, and/or faulty charging link. The method therefore makes it possible to determine the cause of the charging interruption when a charging interruption occurs, which makes it possible to very quickly eliminate a cause of the charging interruption. The method makes it possible to very reliably analyze a cause of charging interruption, including communication via the communication link.

In particular, it is provided in this case that at least one action to eliminate the cause is determined by the electronic computing apparatus when determining the charging interruption based on the determined cause of the charging interruption using a given assignment rule that in particular is saved in the electronic computing unit, and a recommended step that represents the action is output by the output apparatus. In this case, the electronic computing unit may provide the action for the output apparatus selected by the assignment rule for the ascertained cause so that the recommended step that represents the action may be output by the output apparatus. The output apparatus outputting the recommended step that represents the action makes it possible for a user to initiate the action characterized by the recommended step, which allows the cause of the charging interruption to be very quickly eliminated by the user. This allows the charging process to be resumed particularly quickly. Moreover when the user performs the action characterized by the recommended step, it makes it possible for a charging interruption to be avoided in other charging processes, in particular subsequent charging processes for the same energy storage apparatus and/or the same charging apparatus, or respectively it makes it possible to greatly minimize the risk of a charging interruption.

In some embodiments, the charging apparatus connected to the energy storage apparatus via the charging link and via the communication link is identified, and the evaluation of the charging process is assigned to the charging apparatus. When providing the communication link between the energy storage apparatus and the charging apparatus, there may be a so-called handshake in which an ID uniquely identifying the charging apparatus may be provided by the charging apparatus to the energy storage apparatus. Uniquely identifying the charging apparatus, for example by providing the ID uniquely identifying the charging apparatus via the communication link for the energy storage apparatus, makes it possible for the ascertained evaluation of the charging process to be assignable to the charging apparatus. In the assignment of the evaluation of the charging process, it is established that the charging process for which the evaluation was performed, or respectively for which the evaluation is being performed, is carried out by the uniquely identified charging apparatus with the energy storage apparatus. In particular when, in the context of determining the cause of a charging interruption, it is determined that the cause of the charging interruption is at least because of the charging apparatus, it then may be established that the uniquely identified charging apparatus participating in the charging process is faulty. Consequently, to eliminate the cause of the charging interruption, the uniquely identified charging apparatus may undergo a repair process. When there is a determined charging interruption, this allows the charging apparatus identified as faulty to be repaired very quickly.

It is provided in particular that the charging apparatus is identified by the electronic computing apparatus by signal-strength-based localization, and/or localization by a global navigation satellite system. Signal-strength-based localization is a mechanism that is also called a signal level attenuation characterization mechanism (SLAC mechanism). The charging apparatus may be located by the global navigation satellite system, for example via GPS, and/or via Glonass, and/or via Galileo, and/or via Beidou. In other words, the charging apparatus may be identified by the electronic computing apparatus by using its position determined by localization. This in turn allows the location to be determined at which the charging apparatus that is to be repaired and responsible for the charging interruption is arranged. Consequently, repair services may be sent very quickly to the location of the identified charging apparatus responsible for the charging interruption so that the charging apparatus may be repaired very quickly.

In some embodiments, an interference is determined as analytical data of the communication link, such as in particular a noise and/or a ripple, and/or exceeding a given limit of an analog signal, and/or a timeout of a digital signal, and/or a number of repetitions of a query message until a response to the query message is received via the communication link, and/or a signal attenuation, and/or a transmission performance, and/or a synchronization duration of a first power line communication chip of the energy storage apparatus with a second power line communication chip of the charging apparatus, and/or a signal parameter of a pulse width modulation of the communication link. A voltage level, and/or a flank slope of a pulse width modulation pulse, and/or a duty cycle may be determined and analyzed as a signal parameter of the pulse width modulation of the communication link. This allows a particularly comprehensive analysis of the transmission quality of the communication link and, consequently, a particularly reliable prediction of the course of the charging process, or respectively a particularly precise analysis of a cause of a charging interruption.

Other features of the invention may be found in the following description of the FIGS. and with reference to the drawing. The above features and combinations of features mentioned above in the description, as well as the features and combinations of features presented below in the description of the FIGS. and/or just in the FIGS. may be used not only in the indicated combination, but also in other combinations or by themselves without departing from the scope of the invention.

Identical or functionally identical elements are provided with the same reference numerals in the FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
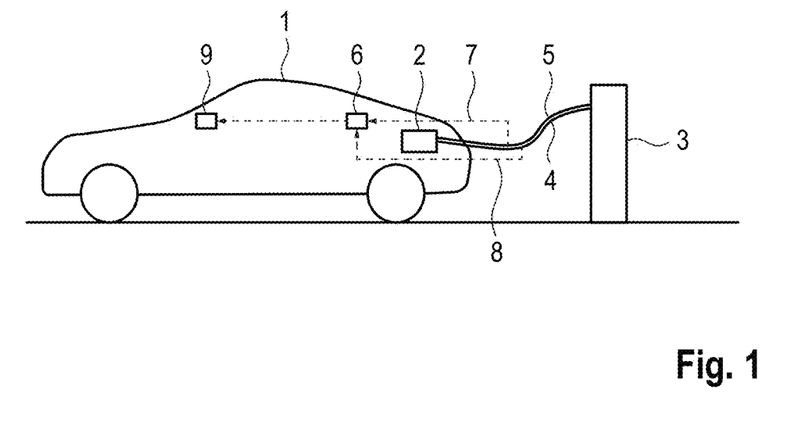
FIG. 1 shows a schematic side view of an embodiment of a motor vehicle having an energy storage apparatus, the energy storage apparatus of which is connected to a charging apparatus via a charging link and via a communication link.

FIG. 1 shows a schematic view of an electrically operable motor vehicle 1, in the present case an electrically operable motor car. The motor vehicle 1 has an energy storage apparatus 2 that is configured to store electrical energy, as well as to provide electrical energy for an electrical drivetrain of the motor vehicle 1. Accordingly, the motor vehicle 1 may be driven with electrical energy from the energy storage apparatus 2. The energy storage apparatus 2 is in particular a high-voltage battery. Moreover, FIG. 1 shows a charging apparatus 3, by means of which electrical energy may be provided for charging the energy storage apparatus 2. To charge the energy storage apparatus 2 with electrical energy from the charging apparatus 3, the energy storage apparatus 2 and the charging apparatus 3 may be connected by a charging link 4. This charging link 4 may be designed conductive or contact-free and in particular inductive. To enable communication between the energy storage apparatus 2 and the charging apparatus 3, it is provided that, in addition to the charging link 4, a communication link 5 is provided between the energy storage apparatus 2 and the charging apparatus 3. This communication link 5 may be provided by a physical link, in particular by at least one cable, between the energy storage apparatus 2 and the charging apparatus 3. Alternatively or in addition, the communication link 5 may be provided by a contact-free link, such as in particular a radio link, between the energy storage apparatus 2 and the charging apparatus 3.

It has been demonstrated that a quality, or respectively a success of a charging process significantly depends on communication between the motor vehicle 1, or respectively the energy storage apparatus 2 and the charging apparatus 3. In order to be able to evaluate a charging process of the energy storage apparatus 2 with electrical energy from the charging apparatus 3, it is therefore beneficial to monitor communication between the energy storage apparatus 2 and the charging apparatus 3. For this purpose, an electronic computing apparatus is provided in the present case. Analytical data 7 of the communication link 5 may be received and evaluated by the electronic computing apparatus 6. Moreover, the electronic computing apparatus 6 is configured to receive measurement data that characterizes power line communication of the charging link 4, and/or at least one charging parameter of electrical energy transmission via the charging link 4. The electronic computing apparatus 6 is configured to assess information transmission between the energy storage apparatus 2 and the charging apparatus 3 via the communication link 5, and to evaluate the charging process at least based on the assessment.

As moreover may be seen in FIG. 1, the motor vehicle 1 comprises an output apparatus 9 in the present case. The electronic computing apparatus 6 is configured to provide the determined evaluation of the charging process for the output apparatus 9, by means of which the evaluation of the charging process may in turn be output. In the present case, the output apparatus 9 is designed as a screen apparatus, by means of which the evaluation of the charging process may be visually output and therefore displayed by providing a light signal characterizing the evaluation. Alternatively, the output apparatus 9 may be part of a mobile electronic terminal such as for example a smart phone, or tablet PC, or another portable computer. The electronic computing apparatus 6 may moreover be configured to provide the evaluation of the charging process for a higher-level server apparatus. By the evaluation of the charging process, a user may be given an estimation of quality of communication of the energy storage apparatus 2 with the charging apparatus 3 at the beginning of the charging process.

Figure 2:
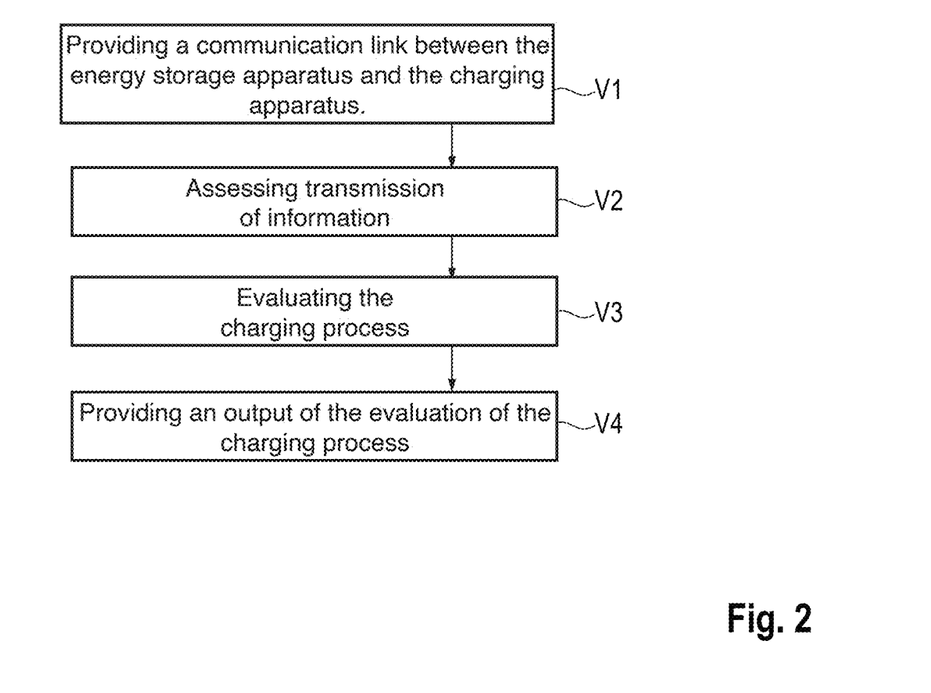
FIG. 2 shows a flow diagram of a method for analyzing a charging process, in which the charging process is evaluated based on an assessment of the information transmission via the communication link, and the evaluation of the charging process is output by an output apparatus.

FIG. 2 shows a method diagram for a method for analyzing the charging process. In the method, it is provided that, in a first method step V1, the communication link 5 is provided between the energy storage apparatus 2 and the charging apparatus 3. The method moreover provides that, in a second method step V2, the transmission of information via the communication link 5 is assessed by the electronic computing apparatus 6. In the communication between the energy storage apparatus 2 and the charging apparatus 3, the electrical energy may be requested, for example by the energy storage apparatus 2, with given parameters such as current intensity and/or voltage from the charging apparatus 3. The information transmission may be analyzed and assessed based on the analytical data 7. As analytical data 7, a noise and/or a residual ripple, which may also be termed so-called ripple, on lines of the communication link 5 used for data transmission may be used as interference. Alternatively or in addition, deviations and/or transgressions of limits of analog signals set by standards, in particular of a control pilot signal, may be determined as analytical data 7 and provided for the electronic computing apparatus 6. The control pilot signal may in particular characterize a maximum possible charging current that may be received by the energy storage apparatus 2, and/or maximum possible charging current that may be provided by the charging apparatus 3. Furthermore, alternatively or additionally, a timeout of a digital signal, called a timing violation, may be determined as analytical data 7 for messages of the particular charging partner connected via the communication link 5, in the present case the energy storage apparatus 2 or the charging apparatus 3, when using digital communication, and may be provided to the electronic computing apparatus 6. A timeout that is also called a timing violation may be determined based on quality, and/or based on decodability, and/or based on maintenance of a series of digital signals via the communication link 5. Moreover, the timeout may be determined based on whether a time window has been maintained for an expected response to a query via the communication link 5. Furthermore, alternatively or additionally, a number of repetitions of query messages may be determined as analytical data 7, which have been sent until a response signal characterizing a response to the particular query messages has been received from the apparatus providing the query messages, such as the energy storage apparatus 2 or the charging apparatus 3. Furthermore, alternatively or in addition, a signal attenuation measurement may be carried out to determine analytical data 7, and a result of this signal attenuation measurement characterized by the analytical data 7 may be provided for the electronic computing apparatus 6. Furthermore, alternatively or in addition, a transmission performance of signals exchanged via the communication link 5 may be detected and provided as analytical data 7 for the electronic computing apparatus 6. Furthermore, alternatively or in addition, a synchronization duration of a power line communication chip of the energy storage apparatus 2, or respectively the motor vehicle 1 with a power line communication chip of the charging apparatus 3, may be determined as analytical data 7 and provided for the electronic computing apparatus 6. There may be pulse width modulation via the control pilot line for a transmission of information between the energy storage apparatus 2 and the charging apparatus 3, wherein at least one signal parameter of the pulse width modulation may be determined as analytical data 7, such as a voltage level and/or a flank slope of a pulse width modulation pulse, and/or a duty cycle. The analytical data 7 may be monitored permanently by the electronic computing apparatus 6. The transmission quality of the communication link 5 may be assessed by the electronic computing apparatus 6 based on the received analytical data 7.

A third method step V3 provides that, by means of the electronic computing apparatus 6, the evaluation of the charging process is prepared based on the assessment of the information transmission. In this case, based on the assessment of the transmission quality of the communication link 5, a forecast may be made by the electronic computing apparatus 6 on a probable determined course of the charging process. The evaluation of the charging process by the electronic computing apparatus 6 in the third method step V3 may be in addition to the analytical data 7 based on the received measurement data 8 of the power line communication. The measurement data 8 characterize at least one power line communication signal provided via the charging link 4 by power line communication.

In a fourth method step V4 of the method, the evaluation of the charging process is output by the output apparatus 9. In doing so, a light signal characterizing the determined forecast of the determined probable course of the charging process may be output by the output apparatus 9, whereby a user may be informed very easily and clearly about the made forecast of the determined probable course of the charging process.

The charging process, or respectively the transmission quality of the communication link 5, may be evaluated alternatively or in addition based on a comparison between a target charging parameter and an actual charging parameter. In this case, the target charging parameter transmitted via the communication link 5 and characterized by a signal is determined by the electronic computing apparatus 6 and compared with the actual charging parameter for the assessment of the transmission of information.

The actual charging parameter characterizes the electrical energy transmitted via the charging link 4 and may be determined by a measuring apparatus. Quality of the charging process may be evaluated based on the determined deviation between the target charging parameter and the actual charging parameter. In the evaluation of the quality of the charging process, it may for example be established that the charging process is running flawlessly, or that a fault has occurred during the charging process.

In particular when determining an interruption of the charging process, a cause of the charging interruption may be determined based on the comparison of the target charging parameter with the actual charging parameter. Accordingly, when the charging interruption occurs, the available data such as the analytical data 7, and/or the measurement data 8, and/or the comparison between the at least one actual charging parameter and the at least one assigned target charging parameter may be linked to each other and assessed. In this case, deviations in message content compared with each other may be used for a direct assignment of whether the charging process was ended by the energy storage apparatus 2 or the charging apparatus 3. In particular, for the evaluation of the charging process, data from the communication link 5, and if applicable additional data that were measured in the motor vehicle 1, and/or data that were measured in the charging apparatus 3 may be used for the evaluation of the charging process.

In the third method step V3, an interruption of the charging process may be determined by the electronic computing apparatus 6, and a cause of the charging interruption may be determined based on the assessment of the information transmission via the communication link 5. To allow the determined cause of the charging interruption to be eliminated very quickly, at least one action for eliminating the cause may be determined by the electronic computing apparatus 6 by an assignment rule that in particular is saved in the electronic computing apparatus 6. This means that particular actions to be performed that eliminate the particular cause are assigned to particular causes of a charge interruption in the saved assignment rule. To get a user to perform the action provided by the assignment rule for the determined cause, a recommended step representing the action may be output by the output apparatus 9. In doing so, this recommended step may for example be visually output as a text message, and/or acoustically as a voice message.

In order for the output apparatus 9 to be able to output the charging apparatus 3 for which the action is to be performed, the charging apparatus 3 connected to the energy storage apparatus 2 via the charging link 4 and the communication link 5 must be identified. Moreover, the charging apparatus 3 connected to the energy storage apparatus 2 via the charging link 4 and the communication link 5 must be identified to be able to send repair resources such as, for example, a person performing the repair, to the charging apparatus 3. The charging apparatus 3 connected via the communication link 5 to the energy storage apparatus 2 may be identified by a unique ID provided via the communication link 5. In doing so, this ID may be provided by the charging apparatus 3 for the energy storage apparatus 2 in a so-called handshake between the charging apparatus 3 and the energy storage apparatus 2. Alternatively or in addition, the charging apparatus 3 may be identified by signal-strength-based localization, and/or localization through a global navigation satellite system. A position of the charging apparatus 3 may be determined by the particular localization. This determined position of the charging apparatus 3 may be provided by the charging apparatus 3 via the communication link 5 to the energy storage apparatus 2. The electronic computing apparatus 6 may be configured to provide the unique identification of the charging apparatus 3 together with a determined cause of the charging interruption to a higher level server apparatus, whereby a repair of the identified charging apparatus 3 may be initiated.

The described method therefore enables an automatic recognition of a cause of a fault, or respectively a fault originator in a charging interruption during the charging process of the energy storage apparatus 2 of the electrically drivable or electrically supportable motor vehicle 1 in the charging apparatus 3, wherein situational user information is possible by combining different databases. Moreover, a predictive estimation of quality of charging communication via the communication link 5 at the beginning of the charging process is enabled by the method. Moreover, the method enables situation-related assistance with recommendations for the user.

In the following, an example of determining predictive quality of the information transmission via communication link 5 will be explained. During the charging process, communication occurs between the motor vehicle 1 and the charging apparatus 3 by pulse wave modulation and power line communication while charging according to the combined charging system. To make it possible for network data to be correctly transmitted between the power line communication chip of the motor vehicle 1 and the power line communication chip of the charging apparatus 3, a so-called signal level attenuation characterization mechanism (SLAC mechanism) may be performed. With this SLAC mechanism, the charging apparatus 3 directly connected to the motor vehicle 1, or respectively the energy storage apparatus 2 of the motor vehicle 1, is uniquely identified after a synchronization of the power line communication chip of the motor vehicle 1 with the power line communications chip of the charging apparatus 3 by measuring a signal strength. This synchronization of the power line communication chip may be part of the so-called handshake. In this context, this SLAC mechanism may be performed by a conductive connection of the charging apparatus 3 with the energy storage apparatus 2.

In the charging process, information on a transmission performance, and/or a synchronization duration, and/or a number of repetitions of query messages may exist and be used for the evaluation of the charging process. Alternatively or in addition, a pulse width modulation signal may be analyzed, and analyzed continually and assessed with respect to deviations of the duty cycle, and/or the voltage level, and/or a flank slope of a particular pulse width modulation pulse. A result of this assessment may be displayed to a user in the form of a display, for example in the form of a transmission power bar, by the output apparatus 9, in particular in the motor vehicle 1, and/or on the outside of the charging apparatus 3, and/or by a display system, such as a smartphone, that is linked to the motor vehicle 1 and/or the charging apparatus 3, for example via a radio link.

To provide the communication link 5, the energy storage apparatus 2 and the charging apparatus 3 are connected in particular both via a control pilot line, in particular for communication, on which the pulse width modulation may take place, as well as via a protective conductor, which may also be called a protective earth conductor and serves to close the circuit. The charging link 4 may be provided by a DC power line.

In the following, an automated analysis of the charging process when there is a charging interruption will be described. An emergency shutdown of the charging apparatus 3 that may be characterized by a status code EVSE Emergency Shutdown may generally be assigned to an internal problem of the charging apparatus 3 and a charging interruption by the charging apparatus 3. More complex relationships may be analyzed by a comparison of many data. In the following example, the values a) "maximum charging current by charging apparatus 3 determined", b) "requested charging current of the energy storage apparatus 2 of the motor vehicle 1", and c) "charging current actually supplied by the charging apparatus 3" may be compared with each other. If the value a) is equal to the value b), wherein both the value a) as well as the value b) are greater than the value c), it may be inferred that the charging apparatus 3 is supplying less charging current than indicated. This evaluation of the charging process may be displayed to the user. In addition, the determined information that the charging apparatus 3 is supplying less charging current than indicated may be saved in a memory of the motor vehicle 1 with position data to identify the charging apparatus 3. If the value a) is greater than the value b), and the value c) is greater than the value b), it may then be inferred that the charging apparatus 3 is not maintaining a charging current specification from the energy storage apparatus 2 of the motor vehicle 1, and there is therefore a safety risk at the charging point.

The charging interruption may be caused in particular by a fault in the power range, in particular with regard to a current intensity, and/or a voltage of the charging current, and/or by a fault in the communication of the energy storage apparatus 2 with the charging apparatus 3, in particular via the communication link 5.

The output apparatus 9 may be designed in particular as an instrument cluster which may be configured to indicate to the driver whether the determined charging interruption has been triggered by the motor vehicle 1 or the charging apparatus 3. By means of the output apparatus 9, a recommendation may be output, in particular for the driver, which characterizes which measures may be initiated after the determined charging interruption, such as a change of the charging apparatus 3, and/or contacting a vehicle manufacturer of the motor vehicle 1, and/or contacting a charging apparatus operator of the charging apparatus 3. Outputting the recommendation via the output apparatus 9 allows the user to solve the problem.

This described assessment of different databases may be integrated in a central computer such as the higher-level server apparatus and therefore available for very many users. The evaluation of the charging process prepared in the method may be used to analyze quality of several charging apparatuses 3. In this case, providing the evaluation of the charging process to charging apparatus operators and/or charging apparatus manufacturers makes it possible to pursue measures that counteract any charging interruptions.

The charging process may in particular be evaluated by the electronic computing apparatus 6 in the motor vehicle 1. Alternatively, the electronic computing apparatus 6, by means of which the evaluation of the charging process is performed, may be part of the charging apparatus 3. If a fault in the charging process, such as in particular a termination of the charging process, is established by the electronic computing apparatus 6 in the context of the evaluation of the charging process, then the electronic computing apparatus 6 may provide the determined evaluation of the charging process to the higher-level server apparatus, which is a so-called backend. Alternatively or in addition, the electronic computing apparatus 6, when it is part of the motor vehicle 1, may provide the determined evaluation of the charging process to the charging apparatus 3. Alternatively, the electronic computing apparatus 6, when it is part of the charging apparatus 3, may provide the determined evaluation of the charging process to the motor vehicle 1, or respectively to the energy storage apparatus 2.

In particular, the teachings herein indicate how a predictive quality of charging communication and automated analysis of charging processes may be enabled.

LIST OF REFERENCE NUMERALS

1 Motor vehicle
2 Energy storage apparatus
3 Charging apparatus
4 Charging link
5 Communication link
6 Electronic computing apparatus
7 Analytical data
8 Measurement data
9 Output apparatus
V1-V4 Method steps The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method of analyzing a charging process of an electrical energy storage apparatus by a charging apparatus, which allows electrical energy to be provided to the energy storage apparatus via a charging link, comprising:
   establishing a communication link between the energy storage apparatus and the charging apparatus which allows information to be exchanged between the energy storage apparatus and the charging apparatus;
   assessing a transmission of information via the communication link by an electronic computing apparatus, comprising determining analytical data of the communication link by the electronic computing ratus;
   determining transmission quality of the communication link based on the analytical data;
   using the electronic computing apparatus, evaluating the charging process based on the assessment of the information transmission and on the determined transmission quality of the communication link; and
   outputting the evaluation of the charging process.

2. The method of claim 1, comprising, using the electronic computing apparatus, predicting a course of the charging process based on the determining of the transmission quality of the communication link; and outputting the prediction by the output apparatus.

3. The method of claim 2, comprising:
   determining at least one actual charging parameter of the electrical energy transmitted via the charging link;
   using the electronic computing apparatus, comparing at least one target charging parameter provided via the communication link from the energy storage apparatus or from the charging apparatus with the determined actual charging parameter; and
   evaluating the charging process based on the comparison.

4. The method of claim 2, comprising determining at least one power line communications signal provided via the charging link by power line communication;
   wherein evaluating the charging process is carried out based on the at least one determined power line communication signal.

5. The method of claim 2, comprising determining an interruption of the charging process by the electronic computing apparatus; and determining a cause of the charging interruption while evaluating the charging process based on the assessment of the information transmission via the communication link.

6. The method of claim 1, comprising:
   determining at least one actual charging parameter of the electrical energy transmitted via the charging link;
   using the electronic computing apparatus, comparing at least one target charging parameter provided via the communication link from the energy storage apparatus or from the charging apparatus with the determined actual charging parameter; and
   evaluating the charging process based on the comparison.

7. The method of claim 6, comprising determining at least one power line communications signal provided via the charging link by power line communication;
   wherein evaluating the charging process is carried out based on the at least one determined power line communication signal.

8. The method of claim 6, comprising determining an interruption of the charging process by the electronic computing apparatus; and determining a cause of the charging interruption while evaluating the charging process based on the assessment of the information transmission via the communication link.

9. The method of claim 1, comprising determining at least one power line communications signal provided via the charging link by power line communication; wherein evaluating the charging process is carried out based on the at least one determined power line communication signal.

10. The method of claim 9, comprising determining an interruption of the charging process by the electronic computing apparatus; and determining a cause of the charging interruption while evaluating the charging process based on the assessment of the information transmission via the communication link.

11. The method of claim 1, comprising determining an interruption of the charging process by the electronic computing apparatus; and determining a cause of the charging interruption while evaluating the charging process based on the assessment of the information transmission via the communication link.

12. The method of claim 11, comprising determining, by the electronic computing apparatus, at least one action to eliminate the cause when determining the charging interruption based on the determined cause of the charging interruption using a given assignment rule, and outputting, by the output apparatus, a recommended step that represents the action.

13. The method of claim 1, comprising identifying the charging apparatus connected to the energy storage apparatus via the charging link and via the communication link; and assigning the evaluation of the charging process to the identified charging apparatus.

14. The method of claim 13, wherein the charging apparatus is identified by the electronic computing apparatus by signal-strength-based localization, and/or localization by a global navigation satellite system.

15. The method of claim 1, wherein one or more of the following are determined as analytical data:
   an interference;
   exceeding a given limit of an analog signal;
   a timeout of a digital signal;
   a number of repetitions of a query message until a response to the query message is received;
   a signal attenuation;
   a transmission performance;
   a synchronization duration of a first power line communication chip of the energy storage apparatus with a second power line communication chip of the charging apparatus; and
   a signal parameter of a pulse width modulation of the communication link, such as a voltage level, flank slope of a pulse width modulation pulse, or duty cycle.

16. The method of claim 1, comprising:
  determining at least one actual charging parameter of the electrical energy transmitted via the charging link;
  using the electronic computing apparatus, comparing at least one target charging parameter provided via the communication link from the energy storage apparatus or from the charging apparatus with the determined actual charging parameter; and
  evaluating the charging process based on the comparison.

17. The method of claim 1, comprising determining at least one power line communications signal provided via the charging link by power line communication; wherein evaluating the charging process is carried out based on the at least one determined power line communication signal.

18. The method of claim 1, comprising determining an interruption of the charging process by the electronic computing apparatus; and determining a cause of the charging interruption while evaluating the charging process based on the assessment of the information transmission via the communication link.

19. The method of claim 18, comprising determining, by the electronic computing apparatus, at least one action to eliminate the cause when determining the charging interruption based on the determined cause of the charging interruption using a given assignment rule, and outputting, by the output apparatus, a recommended step that represents the action.

* * * * *